United States Patent
Fei et al.

(10) Patent No.: US 11,415,690 B2
(45) Date of Patent: Aug. 16, 2022

(54) METHOD AND SYSTEM COMPARING ODOMETER VELOCITY TO RADAR BASED VELOCITY

(71) Applicant: Hella GmbH & Co. KGaA, Lippstadt (DE)

(72) Inventors: Tai Fei, Hamm (DE); Tobias Breddermann, Lippstadt (DE); Ridha Farhoud, Laatzen (DE); Ernst Warsitz, Paderborn (DE); Christopher Grimm, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 229 days.

(21) Appl. No.: 16/639,187

(22) PCT Filed: Aug. 28, 2017

(86) PCT No.: PCT/EP2017/071513
§ 371 (c)(1),
(2) Date: Feb. 14, 2020

(87) PCT Pub. No.: WO2019/042523
PCT Pub. Date: Mar. 7, 2019

(65) Prior Publication Data
US 2020/0241124 A1    Jul. 30, 2020

(51) Int. Cl.
*G01S 13/60*  (2006.01)
*G01S 7/41*   (2006.01)
*G01S 13/931* (2020.01)

(52) U.S. Cl.
CPC .............. *G01S 13/60* (2013.01); *G01S 7/415* (2013.01); *G01S 13/931* (2013.01); *G01S 2013/932* (2020.01)

(58) Field of Classification Search
CPC ........ G01S 13/60; G01S 7/415; G01S 13/931; G01S 2013/932
See application file for complete search history.

(56) References Cited

U.S. PATENT DOCUMENTS 6,300,896 B1   10/2001  Kull et al.
6,459,990 B1 * 10/2002  McCall ................ G01C 21/165
                                                     73/178 R (Continued)

FOREIGN PATENT DOCUMENTS

DE    19910501 A1    9/2000
DE    10215009    *  4/2002  ............. G01S 13/60

(Continued)

*Primary Examiner* — Donald H B Braswell
(74) *Attorney, Agent, or Firm* — Husch Blackwell LLP (57) ABSTRACT

A method is provided for operating a radar system of a vehicle. The radar system has at least one radar sensor for detecting at least one target outside the vehicle. A prediction of an ego-velocity (vEgo) of the vehicle is performed, so that a prediction result is determined. A classification for classifying the at least one detected target as a stationary target is then performed using the prediction result, so that a classification result is determined. One of at least two estimation methods is then selected for an estimation of the ego-velocity (vEgo), such that the selection is dependent on an evaluation of the classification result.

10 Claims, 5 Drawing Sheets

(56) References Cited

U.S. PATENT DOCUMENTS

| | | | | |
|---|---|---|---|---|
| 2012/0053831 | A1* | 3/2012 | Halder | G01S 19/49 |
| | | | | 701/439 |
| 2016/0349362 | A1* | 12/2016 | Rohr | G01C 21/28 |
| 2018/0045811 | A1* | 2/2018 | Cao | G01S 7/4026 |
| 2019/0003838 | A1* | 1/2019 | Kudrynski | G01C 21/3837 |
| 2019/0257936 | A1* | 8/2019 | Balogh | G01S 13/60 |
| 2019/0258251 | A1* | 8/2019 | Ditty | G06V 20/58 |

FOREIGN PATENT DOCUMENTS

| | | |
|---|---|---|
| DE | 10215009 A1 | 10/2003 |
| DE | 102006042766 A1 | 3/2008 |
| DE | 102011118249 A1 | 5/2013 |
| EP | 1874581 A1 | 1/2008 |
| FR | 2916539 A1 | 11/2008 |
| GB | 2402502 A | 12/2004 |
| WO | 2013102507 A1 | 7/2013 |

\* cited by examiner

METHOD AND SYSTEM COMPARING ODOMETER VELOCITY TO RADAR BASED VELOCITY

CROSS REFERENCE

This application claims priority to PCT Application No. PCT/EP2017/071513, filed Aug. 28, 2017, the entirety which is hereby incorporated by reference.

FIELD OF THE INVENTION

The present invention is related to a method and a system for an operation of a radar system.

BACKGROUND

The accurate estimation of the ego-vehicle velocity (hereinafter also: ego-velocity) is an important requirement for providing actual driver assistance functionalities like Adaptive Cruise Control or Rear Cross Traffic Alert. It is known that the estimation can be performed based on special wheel encoders, which measure the revs of the wheels. Under the assumption of neglecting tire slip and with the knowledge of the tire diameter, it is possible to estimate the ego velocity sufficiently well.

However, this so-called odometric velocity estimation has significant drawbacks. For instance, if the tire diameter is not known exactly, the estimation will result in a velocity proportional error. Also, the odometric sensors need a minimum angular wheel velocity to provide reliable speed estimate, resulting in a non-observable velocity estimate at low vehicle velocities.

Other known solutions for sufficient velocity estimation provide a detection of stationary targets using a radar system. However, the operation of the radar system for the classification of detected targets as being stationary or dynamic is technically complex and often not sufficiently reliable, robust and/or precise. Furthermore, known methods for classifying targets as stationary commonly use costly algorithm. This has the further drawback that integration on hardware like embedded hardware with low performance chipsets is not possible.

An approach for estimating the ego motion based on detected stationary targets is known from the publication: D. Kellner et al., Instantaneous Lateral Velocity Estimation of a vehicle using Doppler radar, in Proceedings of the 16th International Conference on Information Fusion, 2013.

SUMMARY OF THE INVENTION

It is an object of the present invention to overcome aforesaid problems at least partially. Particularly, it is an object of the present invention to provide a simplified and/or more reliable and/or more precise solution for operating a radar system, particularly for the classification of stationary and dynamic targets of a radar sensor.

Particularly, the object is achieved by a method for operating a radar system of a vehicle, wherein the radar system has at least one radar sensor for detecting at least one target outside the vehicle, comprising the following steps:

Performing a prediction of an ego-velocity of the vehicle, so that a prediction result is determined (prediction step), wherein particularly the prediction result comprises a variance information about a variance of the prediction, Performing a classification for classifying the at least one detected target as a stationary target using the prediction result, for example at least the predicted ego-velocity and/or variance information, and/or using a radar information (like a relative velocity of a detected target), so that a classification result is determined (classification step), Selecting one of at least two estimation methods for an estimation of the ego-velocity, wherein the selection is dependent on an evaluation of the classification result.

Particularly, the step of selecting one of at least two estimation methods considers the case that the number of stationary radar targets (stationary targets detected by the radar system) is not sufficient for accurate ego-velocity estimation. Therefore, the inventive method enables a precise and robust classification of stationary and dynamic targets of an automotive radar system. Particularly, precise in the sense that a high classification precision can be reached and robust in the sense that the classification quality remains high even with inaccurate ego-velocity information. The evaluation of the classification result according to the selection step can comprise a decision, wherein particularly a comparison is performed as basis for the decision (hereinafter referred to as decision step). Preferably, the estimated and/or a (corrected) predicted ego-velocity can be used for at least one driver assistance functionality of the vehicle like Adaptive Cruise Control or Rear Cross Traffic Alert. Particularly, the steps (individually or together) of the inventive method are carried out repeated, particularly iteratively.

Optionally, the vehicle is configured as a passenger vehicle and/or electric vehicle and/or motor vehicle and/or land vehicle and/or truck. The term "ego-vehicle" also refers to this vehicle, since its ego-velocity is estimated.

Provision can be made for at least one step of the inventive method, particularly for the prediction and/or classification and/or selecting and/or estimating, to be performed subsequently to a measurement and/or detection step performed by the radar sensor, wherein the at least one target is detected in the detection step and/or at least one radar signal is measured in the measurement step. Furthermore, in at least one of these steps, a radar information, particularly a relative velocity and/or an angle of incidence for each detected target can be determined.

Optionally, after the prediction step (comprising advantageously the prediction of an ego-velocity and/or a variance) the classification is performed using the prediction result, particularly the predicted ego-velocity and/or a predicted variance. For example, the predicted ego-velocity and/or the predicted variance can be used for calculating the relative velocity and/or to decide if a detected target is stationary. Particularly, the variance can be used to determine a comparison range which is used to decide if the detected target is stationary. Additionally, further information can be utilized for the classification, particularly an angle of incident for each detected target (i. e. the angle of incidence of the corresponding radar reflection) and/or a relative velocity of each detected target (or radar reflection respectively) measured by the radar sensor. Subsequently, the ego-velocity can be estimated using the information from the classification result about targets classified as being stationary, referred to as radar based velocity estimation. This estimation can be used to correct the ego-velocity determined by the prediction (referred to as "correction of the prediction") and/or by the odometry of the vehicle (referred to as "correction of the odometric velocity").

Particularly, the odometric velocity can be corrected using recursive estimation through a model. By using the correction of the odometric velocity, a corrected odometric velocity is obtained. If the classification result does not allow for a sufficient estimation of the ego-velocity (for example, the number of stationary targets is not sufficient), the corrected odometric velocity can be used for the correction of the prediction. This allows for obtaining an instantaneously velocity estimation, even for the case that the number stationary targets is not sufficient. Additionally, if stationary targets are classified, then the estimated ego-velocity can be used to adjust a classifier for the classification adaptively to improve the classification accuracy.

Particularly, the invention allows for a precise and robust classification even if the ego-velocity information that is provided by a vehicle interface (for instance by odometry) is incorrect. Hereafter, this ego-velocity information provided by the vehicle interface designates velocity information about the ego-velocity of the ego-vehicle which is determined independently from the radar system, for instance provided by a vehicle manufacturer, preferably by odometry, particularly preferably read from a CAN (Controller Area Network) interface of the vehicle, and is denoted below as "vehicle intern velocity information".

It can be provided that the inventive method can discriminate stationary and dynamic radar targets detected (classification) and then utilize the knowledge of the relative velocity and the angle between stationary targets and the vehicle (ego car) to provide an estimate of the ego-velocity. In order to provide the best possible discrimination between moving and stationary targets a precise knowledge of the ego velocity has to be estimated since it directly can influence the velocity window of stationary target observations (see e. g. C. Grimm and R. Farhoud and T. Fei and E. Warsitz and R. Haeb-Umbach, Hypothesis test for the detection of moving targets in automotive radar, in Proceedings of the IEEE International Conference on Microwaves, Communications, Antennas and Electronic Systems, 2017).

According to another aspect of the invention, the classification can be performed on the basis of at least three parameters: the ego-velocity (vEgo) of the vehicle, the angle of incidence (phi) of a reflecting target and the relative velocity (vR) of the reflecting target. For instance, the predicted ego-velocity from the prediction step can be used as the ego-velocity vEgo. Alternatively, or additionally, the classification can use variance information determined in the prediction step. The variance information and/or the predicted ego-velocity can be part of the prediction result. The variance information can, for example, be (directly or indirectly after further processing for providing a comparison range) compared to a relative velocity vR of a detected target in order to classify the detected target as stationary (or dynamic). The relative velocity vR can be determined by the radar sensor. The classification of targets as being stationary and/or the number of targets classified as being stationary can be part of the classification result.

Particularly, the predicted ego-velocity is determined in the prediction step using a Regression or linear prediction algorithm or Kalman filtering based on vehicle parameters like vehicle acceleration and/or based on correction information provided by a correction of the prediction.

The subsequent classification can preferably be based on the physical model $$vR = vEgo * \cos(phi).$$

Subsequently, this equation can be solved for vEgo for correcting a determined ego-velocity, particularly the predicted ego-velocity (predicted in the prediction step), of the vehicle using the stationary targets (this can, for example, be performed in the correction step and/or in a first estimation method of this inventive method subsequently to the classification). In other words, radar based velocity estimation can be carried out in order to estimate the ego-velocity of the vehicle by using the classification result about detected stationary targets and a radar information (the angle of incidence and the relative velocity of the detected stationary targets). Preferably, after this correction of the prediction (for instance in the correction step) another correction of an (ego-) velocity information (particularly the vehicle intern velocity information) can be performed, for instance by using a correction model and a recursive estimation of the velocity. Particularly, an idea according to the invention is that if the number of stationary targets is not sufficient for estimating the ego-velocity appropriately (for example via a first estimation method) an alternative estimation method (for example a second estimation method) can be used. For the second estimation method, for instance, the vehicle intern velocity information can be used for the correction of the prediction and/or for providing an instantaneously velocity estimation, so that the stability of the classification can be maintained. Particularly by using this correction model, instantaneously ego-velocity estimation can be provided at any given time (particularly either by the first or by the second estimation method).

It is conceivable that for the detection of stationary radar targets, i. e. for the classification step, a statistical hypothesis test is utilized as presented in C. Grimm and R. Farhoud and T. Fei and E. Warsitz and R. Haeb-Umbach, Hypothesis test for the detection of moving targets in automotive radar, in Proceedings of the IEEE International Conference on Microwaves, Communications, Antennas and Electronic Systems, 2017. Accordingly, single method steps described below, like the classification step, can at least partially be found in the disclosure of the above-mentioned publication.

According to the classification step, the likelihood for a stationary target can be calculated from the ego-velocity. Here, for example, the predicted ego-velocity (according to the prediction step) or the estimated ego-velocity (according to the estimation methods) can be used. Furthermore, the radar measured azimuth angle of the incoming reflecting target and the relative speed of the target ("vR") can be used for the calculation. Since the variables are modeled as random variables, a confidence interval of the difference e between the measured and the expected velocity of the raw targets can be calculated (for instance referred to as a comparison range). If the difference between the measured velocity and the expectation lies outside a parametrized interval for stationary raw targets ($\mu_E \pm \sigma_E \cdot Q^{-1}(\alpha/2)$), then it is not probable that it stems from a stationary target, described by $H_0$ Hypothesis reject $H_0$, if $e \leq \mu_E - \sigma_E \cdot Q^{-1}(\alpha/2)$ or $e \geq \mu_E + \sigma_E \cdot Q^{-1}(\alpha/2)$.

Factors of influence for the interval can be the angle of incidence $\hat{\mu}_\Phi$ (or "phi") of a reflecting target, and/or the ego velocity $\mu_{V_{Ego}}$ (or "vEgo"), and/or the standard deviation of the ego-velocity measurement $\sigma_{V_{Ego}}$, and/or the standard deviation of the angle measurement $\hat{\sigma}_\Phi$, and/or the standard deviation of the relative velocity measurement by radar $\sigma_{V_r}$.

Particularly, this parametrized interval is referred to as "comparison range", and for the best classification accuracy it is necessary to have the smallest necessary parametrized interval (comparison range) as possible. A significant development potential for interval reduction can be achieved by accurate ego-velocity information. However, the ego-velocity information provided by the vehicle manufacturer (and for example read from a vehicle interface as odometric velocity) is not always unbiased and can continue to increase as a result of mechanical wear of the involved parts over the life of the vehicle. A precise classification is then difficult. So in order to achieve better classification rates it is necessary to reduce the uncertainty of the ego-velocity. Here, it is beneficial to use the radar based velocity estimation.

It can be provided that radar based velocity estimation is used for an estimation method. When stationary targets are detected and a longitudinal movement of the ego-vehicle is assumed, one can describe the kinematic states as relative values. Preferably, the relative or radial velocity Rvx of a target as well as its angle of incidence Rphi can be measured by the radar sensor. The velocity information vEgo of the ego car can, for example, be obtained by the vehicle odometry system as an estimated odometric velocity and/or can be predicted by the prediction step and/or estimated based on the radar measurements. In other words, the radar based velocity estimation performs an estimation of the ego-velocity based on the classification result (stationary targets) and based on radar information (e. g. relative velocity Rvx and/or angle of incidence Rphi). The equation of velocity, which can be used for the radar based velocity estimation, can then be described as $$Rvx = vEgo * \cos(Rphi).$$

For instance, one can estimate the ego-velocity using maximum likelihood estimation methods. Furthermore, the variance of the radically measured velocities $\sigma_{V_r}^2$ and the variance of the angle measurement $\sigma_\Phi^2$ can be modeled as Gaussian distributed and/or a regression can be performed, preferably by using closed solution regression algorithms. Particularly, an Orthogonal Distance Regression (ODR) can be used, which identifies the regression line through the batch of measurements taking into account the individual variances of the radial-velocity and angle measurements. The regression line can be calculated iteratively, so that the non-linearity of the described equation can be considered. Particularly, the velocity can be estimated appropriately with a closed solution regression algorithm without sacrificing the accuracy so much.

Advantageously, an ODR regression without individual variances can be used. Integrated via Principle Component Analysis (PCA), this regression performs an unitary transformation which maximizes/minimizes the variance in the data. The case where poor velocity estimation will occur happens, if the second order moments will be dominated by the individual variances $\hat{\sigma}_\Phi^2$ and $\hat{\sigma}_{V_R}^2$ over the correlating relationship.

$$E\left[\begin{bmatrix}\cos(\phi)\\v_r\end{bmatrix}^2\right] = \underbrace{\begin{bmatrix}\hat{\sigma}_\Phi^2 & 0\\0 & \sigma_{v_r}^2\end{bmatrix}}_{\text{error covariance}} + \underbrace{\begin{bmatrix}\cos(\phi)^2 & \cos(\phi)^2 v_{Ego}\\\cos(\phi)^2 v_{Ego} & \cos(\phi)^2 v_{Ego}^2\end{bmatrix}}_{\text{correlating relationship}}$$

Due to the fact that the distance has quadratic influence (in mechanical engineering this is called "parallel axes theorem") stationary targets with high distance to the origin will certainly dominate the calculation of the principle axis.

However, if the radar measurements and/or the classification result are not sufficient, odometry based velocity estimation can be used for an estimation method. Here, the odometric velocity, which can be provided by the vehicle manufacturer, can be received from the interface of the vehicle. Subsequently, the received odometric velocity can be corrected for providing a corrected odometric velocity. The odometry based velocity estimation can, particularly, be carried out without using radar information.

Preferably, it is provided that the at least two estimation methods comprise:

As a first estimation method: Performing a radar based velocity estimation, which is dependent on the at least one target classified as the stationary target and/or on additional radar information, and As a second estimation method: Performing odometry based velocity estimation, particularly wherein a corrected odometric velocity is used based on a velocity information read from an interface of the vehicle, wherein particularly the estimation of the ego-velocity is used to correct the predicted ego-velocity.

In other words, the first estimation method determines the ego-velocity based on the classification result (particularly the stationary targets), so that this radar based velocity estimation should only be performed if the classification result allows estimating the ego-velocity with a sufficient precision. Otherwise, the second estimation method is more appropriate, since it can provide the odometric velocity estimation. In order to decide whether the first or second estimation method is selected, a decision step can be performed. Furthermore, according to another aspect of the invention, the odometric velocity can be further improved by a correction, for instance based on results of preceding estimations.

It is a further aspect of the invention that the evaluation of the classification result on which the selection is dependent comprises:

Comparing a number of targets classified as being stationary targets with a predetermined minimum number of stationary targets, wherein a first estimation method is performed only if this number of targets is higher than or equal to the minimum number of stationary targets, and a second estimation method is performed otherwise, and particularly the second estimation method is performed only if the predicted ego-velocity is higher than or equal to a predetermined minimum velocity.

It can be provided that the predetermined minimum velocity is in the range from 0.5 m/s to 4 m/s, preferably from 1 m/s to 3 m/s, particularly 2 m/s. This can be the limit where an unobservable velocity interval has no effect. In other words, when the velocity is lower than the minimum velocity, the usage of an odometric velocity is not suitable, for instance due to systematic errors or the like. In this case, i. e. the velocity is lower than the minimum velocity, the inventive method can restart directly at the prediction step. However, the (absolute value of the) predetermined minimum velocity can preferably be set to zero, so that the second estimation method is always performed if the number of targets classified as stationary is lower than the predetermined minimum number of stationary targets.

According to a further aspect of the invention, the predetermined minimum number of stationary targets is at least 1 or at least 5 or at least 10 or is in the range from 1 to 10, preferably 2 to 8, particularly preferably 4 to 6, especially 5. Particularly, if the number of observed stationary targets (detected targets that were classified to be stationary) is less than the minimum number, for instance less than 5, and/or the (predicted) velocity is smaller than a predetermined minimum velocity, for instance below 2 m/s, the velocity estimate methods cannot be used as a measurement for the prediction and/or the Kalman filter.

It is a further aspect of the invention that the step of performing the prediction comprises: Predicting the ego-velocity and determining corresponding variance information by using Kalman filtering and/or a tracking algorithm. Since the velocity is crucial to classify stationary targets, it is useful to ensure plausibility via proper model filtering. Therefore, it can be provided that a Kalman filter is used for predicting the ego-velocity. The Kalman filtering allows the estimation and smoothing of an expected ego-velocity by means of modeling the physical transmission behavior of the vehicle in the event of noisy and temporarily missing state measurements. The usage of the Kalman filter improves the performance of the velocity estimation of the ego vehicle and the discrimination of the stationary and dynamically moving targets.

According to another aspect of the invention, a system covariance matrix Q is used for the step of performing the prediction. This can address the problem that a model assumption of constant acceleration is not suitable for dynamic driver maneuvers. An error of the acceleration $\ddot{x}_{error}$ can be assumed as an additive and average-free normal distributed random variable with variance $\sigma_a^2$ for the constant acceleration $\dot{v}_{Ego}$. This random acceleration, like the constant acceleration, can be projected into the state vector x over the second column of the system matrix. In order to obtain the covariance matrix of the system, the system can first be formed as a random process with $\dot{v}_{Ego_{Error}}$ as additive Gaussian noise $$\begin{bmatrix} v_{Ego} \\ \dot{v}_{Ego} \end{bmatrix}_p = \begin{bmatrix} 1 & \Delta T \\ 0 & 1 \end{bmatrix} \begin{bmatrix} v_{Ego} \\ \dot{v}_{Ego} \end{bmatrix} + \begin{bmatrix} \Delta T \\ 1 \end{bmatrix} \dot{v}_{Ego_{Error}}$$

$$= \begin{bmatrix} 1 & \Delta T \\ 0 & 1 \end{bmatrix} \begin{bmatrix} v_{Ego} \\ \dot{v}_{Ego} \end{bmatrix} + \begin{bmatrix} \Delta T \\ 1 \end{bmatrix} \mathcal{N}(0, \sigma_a^2).$$

The process covariance from the second central moment of the system can then be calculated as a random process $$Q = \begin{bmatrix} \Delta T^2 & \Delta T \\ \Delta T & 1 \end{bmatrix} \sigma_a^2$$

Since modern vehicles can reach a maximum acceleration of approximately $a_{max}=10$ ms$^{-2}$, these values can advantageously be selected as the maximum deviation in the acceleration. In an interval width around the three-fold standard deviation around the expected value of a normally distributed random variable, approximately 99.7% probability of all realizations can be covered. This probability can be sufficient and allows to set the hyperparameter $\sigma_a$ particularly as $$\sigma_a = \frac{a_{max}}{3}$$

$$= \frac{10 \text{ ms}^{-2}}{3}.$$

It can be provided that the Kalman filter is fed from the radar system with the ego speed point estimate. In the prediction step, the Kalman filter can preferably estimate the actual ego velocity and the velocity variance, which can then be used to classify stationary targets. Subsequently, stationary targets can be utilized to estimate the ego velocity and measurement error followed by a correction step of the Kalman filter.

Advantageously, it is possible that the ego-velocity is predicted by the Kalman filter. Particularly if not enough stationary raw targets have been detected at a time in order to perform an ego-velocity estimate, a prediction of the missing velocity can still be made via the Kalman filter.

Furthermore, by using the estimation of the ego-velocity and the estimation of the variance the classifier used for the classification can be adaptively adjusted regarding the classification precision. Additionally, if the correction model is used in the case that the number of stationary targets is not sufficient, the stability of the classification and/or ego-velocity estimation can be increased significantly.

It may also be provided that the determined variance information (e. g. determined in the prediction step) is used for performing the classification, particularly by determining a comparison range based on the variance information, wherein, for example, a detection information (like a relative velocity or an angle of incidence or the like) of each detected target is compared to the comparison range, and preferably the at least one detected target is classified as a stationary target if the detection information, like the relative velocity, lies within the comparison range. Advantageously, the comparison range can be a parametrized interval and/or a predetermined (or predefined) value range, which is specific for values of the relative velocity that indicate a stationary target. The comparison range can, for example, be defined empirically and/or be reduced and/or increased dependent on (e. g. proportional) to the amount of variance indicated by the variance information (taken from the prediction step). Furthermore, the comparison range and/or the variance information can be determined dependent on the relative velocity (vR) of a detected target and/or the angle of incidence (phi) of a detected target and/or the like. This allows for a reliable classification of stationary targets.

According to a further advantage, the classification can comprise a step of comparing the relative velocity vR to a (comparison) range influenced by the angle of detection (particularly angle of incidence) phi or a step of comparing the angle of detection phi to a (comparison) range influenced by the relative velocity vR. Naturally, similar comparison or analysis steps for a classification using a comparison range are part of the invention, even if exemplary only one of the variants (e. g. the comparison of the relative velocity with the comparison range) is mentioned.

It is also conceivable that a first estimation method comprises: Estimating the instantaneous ego-velocity of the vehicle based on the classification, particularly on the targets classified as stationary targets, particularly preferably by using a regression algorithm. The regression algorithm can be an iterative regression algorithm, for instance an ODR. This can be advantageously due to a nonlinear system model.

It is optional that a second estimation method comprises: Estimating the instantaneous ego-velocity of the vehicle based on a corrected odometric velocity, wherein preferably the corrected odometric velocity is determined from an odometric velocity that is corrected by a (e. g. linear) model according to an appropriate system model. Here, model parameters (e. g. $\beta_1$ and/or $\beta_2$) can be adapted, for instance by a Recursive Least Square (RLS) approach.

It may also be provided that after the step of selecting the selected estimation method is performed, and after the step of performing the selected estimation method at least one parameter of the prediction, particularly for a Kalman-Filtering, is adapted and/or corrected using the estimated ego-velocity. This adaptation can be dependent on the classification result and/or on the ego-velocity estimated by the selected estimation method. Stationary targets can for example be utilized to estimate the ego-velocity and measurement error followed by the correction step of Kalman filtering. This correction step can comprise the adaptation of the at least one parameter for the prediction, so that the prediction can be improved.

It can be conceivable that before or after the step of adapting the parameter of the prediction, an odometry correction is performed based on a parameter estimation, particularly using a Recursive Least Square approach. For examples, systematic errors of the odometric velocity measurement can be corrected. Similar to the correction step of the Kalman filtering, preceding results and/or error information and/or the variance information and/or regression and/or modelling can be used to improve the odometric velocity.

If consecutive prediction steps need to be performed, for example due to lost stationary targets, the predicted velocity might significantly deviate from the true velocity and the predicted variance can increase fast, so that dynamic targets might be misclassified as stationary targets. To handle this, it can be useful to estimate the velocity based on a corrected odometric velocity $v_{Ego,CAN}$. However, this can be corrupted due to errors in tire diameter resulting in a linear proportional error term. Therefore, according to another aspect of the invention, a linear model can be used to correct this issue:

$$\hat{v}_{Ego} = \beta_1 * v_{Ego,CAN} + \beta_0.$$

While the tire diameter will change over the vehicles lifespan, it can be provided to adapt the model parameters over time, for example by using a Recursive Least Square (RLS) approach, particularly with forgetting (for instance, the forgetting parameter can be 0.99) to estimate the ego-velocity via odometric based velocity signal. (Such a recursive least square approach is for example described in S. Haykin, Adaptive Filter Theory, Prentice Hall, Inc., 1996).

A further aspect of the present invention is a system, particularly radar system, for a vehicle, comprising:
a radar sensor for detecting at least one target outside the vehicle,
at least one control unit for performing the steps of an inventive method.
By carrying out the inventive method with the inventive system, the inventive system comes up with the same advantages which have been discussed in detail with respect to the inventive method.

A further aspect of the present invention is a computer program product being stored on a computer readable medium for operating a radar system, comprising the following:
Computer readable program means, initiating the computer to perform a prediction of an ego-velocity of the vehicle, so that a prediction result is determined,
Computer readable program means, initiating the computer to perform a classification for classifying the at least one target as a stationary target using the prediction result, so that a classification result is determined,
Computer readable program means, initiating the computer to select one of at least two estimation methods for an estimation of the ego-velocity, wherein the selection is dependent on an evaluation of the classification result.

Particularly, an inventive computer program product can be used to initiate the computer to perform the steps of an inventive method. Therefore, the inventive computer program product comes up with the same advantages which have been discussed in detail with respect to the inventive method and/or inventive system.

It can be provided that the computer program product is configured for a detection of moving targets in sight of a radar sensor, particularly an automotive radar sensor, particularly preferably of an inventive radar system. In particular, the computer program product comprises a computer readable means which is configured to initiate the computer to perform an inventive method. This has the advantage that the computer program product can handle distorted ego-velocity information. According to a further aspect of the invention, the computer program product is able to estimate the ego-velocity based on previously detected stationary targets with high accuracy subsequently used for the target classification.

BRIEF DESCRIPTION OF THE DRAWINGS

Reference is now made more particularly to the drawings, which illustrate the best presently known mode of carrying out the invention and wherein similar reference characters indicate the same parts throughout the views.

Figure 1:
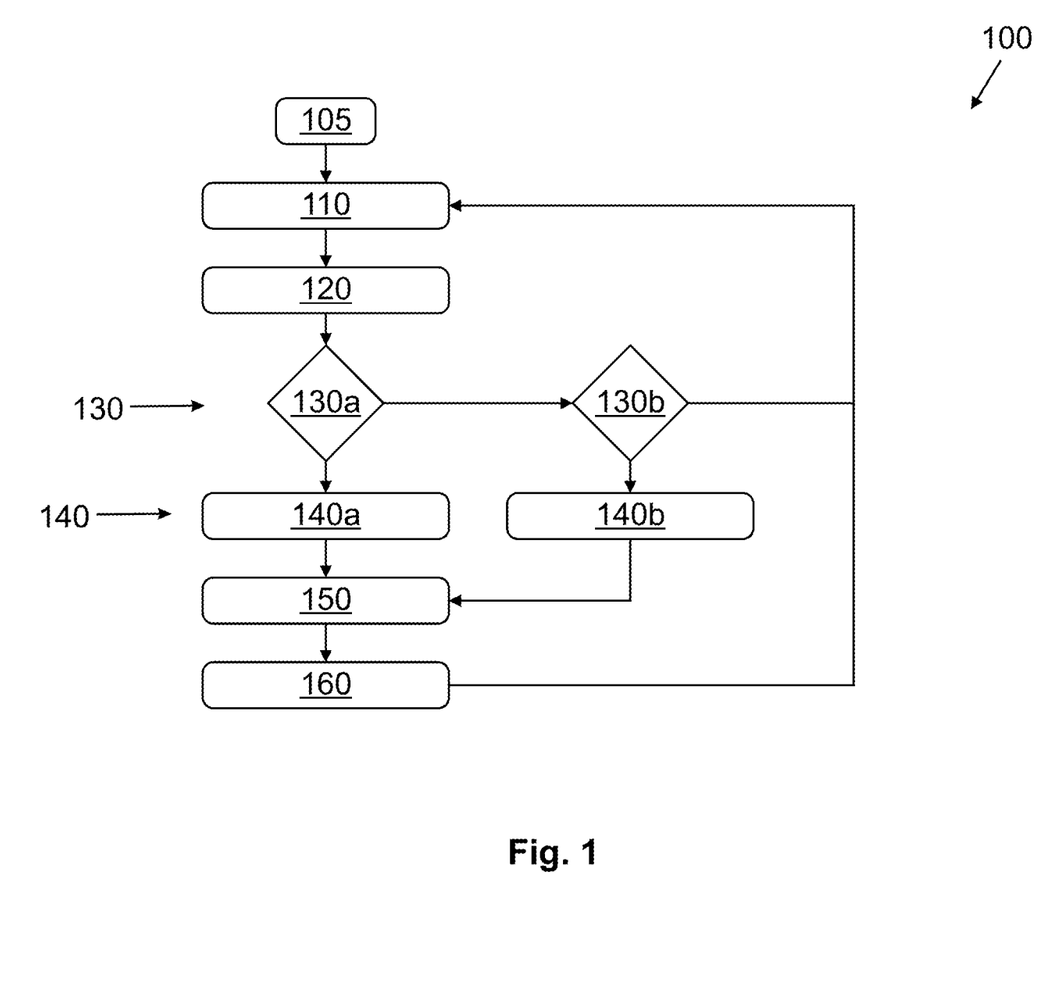
FIG. 1 is a flow chart of the inventive method.

FIG. 1 shows a flow chart for a visualization of the inventive method 100. First, an initialization step 105 can be performed when a vehicle 2 is started, which advantageously comprises setting the ego-velocity vEgo on 0 m/s and the ego-acceleration of the vehicle 2 on 0 m/s$^2$. Naturally, the vehicle 2 refers to the ego-vehicle 2.

Figure 2:
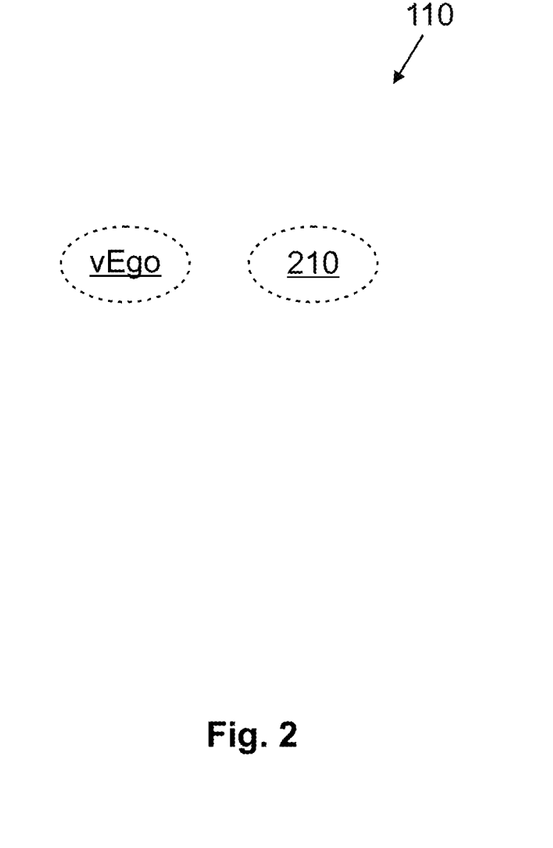
FIG. 2 is a prediction step of the inventive method.

In the prediction step 110, Kalman filtering can be used to predict the ego-velocity vEgo and optionally a variance information 210, which can provide the variance of the prediction (as shown in FIG. 2). This result of the prediction step 110 is referred to as "prediction result".

Figure 3:
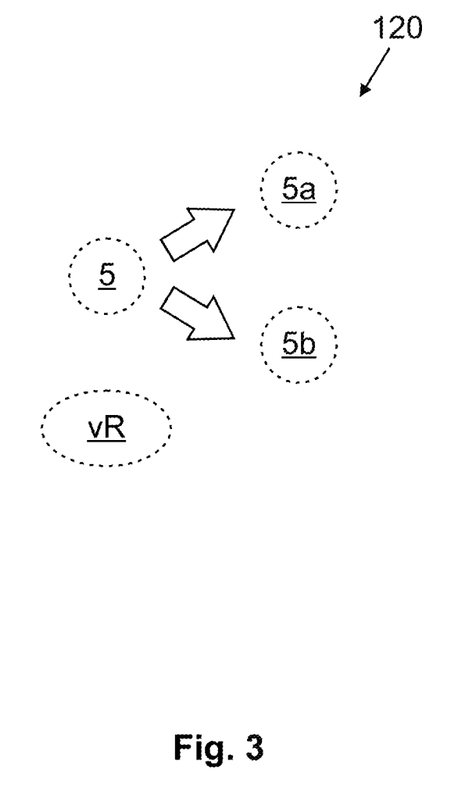
FIG. 3 is a classification step of the inventive method.

Subsequently, stationary targets 5a can be determined by the classification step 120 (as also shown in FIG. 3). Here, a classification of at least one detected target 5 as stationary target 5a and dynamic target 5b can be performed. Furthermore, in the initialization step 105 at least one initial threshold value can be determined or defined which can be used to determine a comparison range. The comparison range can, for example, be used in the classification step 120 to discriminate stationary targets 5a from dynamic targets 5b by considering the relative velocity vR of the detected targets 5. Particularly, the at least one threshold value (or the comparison range which results from the at least one threshold value) is compared to the relative velocity vR. Advantageously, if the comparison has the result that the relative velocity vR of a detected target 5 lies within the comparison range, then the detected target 5 is classified as being stationary. Otherwise, the detected target 5 can be classified as being dynamic. The lower the variance of the prediction (determined by the variance information 210) the smaller the comparison range can be.

Figure 4:
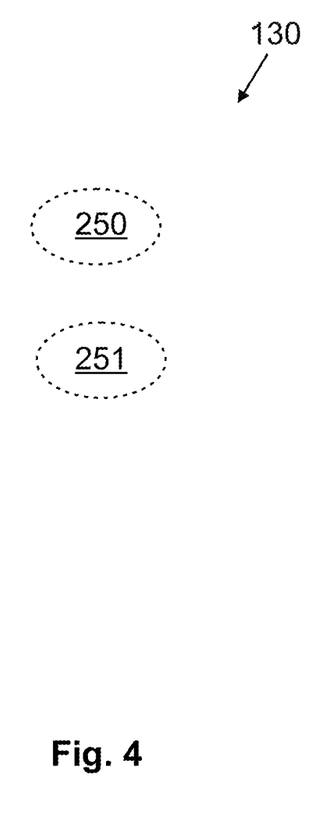
FIG. 4 is a decision step of the inventive method.

Subsequently, the ego-velocity vEgo can be estimated by one of the estimation methods 140. For instance, a first estimation method 140a can be used which utilized a result of the classification step 120 and/or a result of the prediction step 110 (for example the variance information 210). Here, the instantaneous ego-velocity vEgo can be estimated, for instance by a regression filter. If, however, the result of the preceding steps (particularly the result of the classification step 120) is not sufficient for an estimation, an alternative second estimation method 140b can be used to estimate the ego-velocity vEgo of the vehicle 2. For instance, the second estimation method 140b comprises an estimation using an odometry signal, particularly a corrected odometric velocity, of the vehicle 2 (this can be retrieved from an interface 3, particularly CAN-interface of the vehicle 2, and/or corrected in the odometry correction step 160). The decision of whether the first 140a or the second estimation method 140b is performed can be made in a decision step 130 (as also shown in FIG. 4). Here, a first decision 130a can be made, which comprises comparing the number of targets 5 classified as being stationary with a minimum number of stationary targets 250. Subsequently, if the first decision 130 is negative, the ego-velocity vEgo can be compared with a minimum velocity 251 for a second decision 130b. If the number of stationary targets 5a is higher as or equal to the minimum number of stationary targets 250, the first estimation method 140a can be selected and performed. If the number of stationary targets 5a is less than the minimum number of stationary targets 250 the second decision 130b can be initiated. If in the second decision 130b the ego-velocity vEgo is higher as or equal to the minimum velocity 251, the second estimation method 140b can be selected and performed. If the ego-velocity vEgo is smaller, the prediction step 110 can be performed again without estimation of the ego-velocity vEgo.

In the next correction step 150, the result of the prediction step 110 can be combined with the result of the selected estimation method 140, in order to improve the estimation of the ego-velocity vEgo and/or to adaptively adjust the parameter used in the prediction step 110, particularly for the Kalman filter.

Subsequently, in the odometry correction step 160, a linear model can be used to correct the velocity information, i. e. ego-velocity information, given by the odometry of the vehicle 2. The velocity information by the odometry can, for example, be provided by and read from a vehicle interface 3, particularly a CAN bus interface. However, this velocity information can be highly corrupted, so that a correction of the velocity information is useful. Therefore, the linear model can be used to determine a corrected odometric velocity based on preceding result (e. g. prediction and/or classification and/or estimation results).

Figure 5:
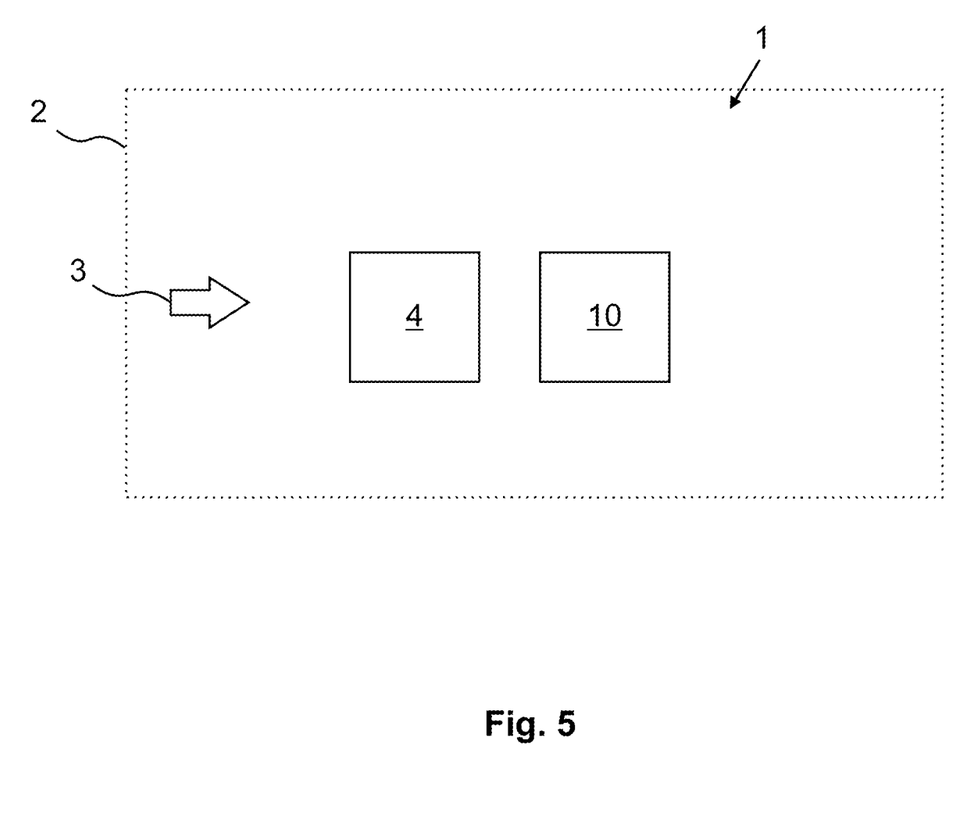
FIG. 5 illustrates parts of a radar system.

The inventive method 100 can be used to operate a radar system 1 and/or a control unit 4 of a vehicle 2, as shown schematically in FIG. 5. The radar system 1 can have at least one radar sensor 10 for detecting at least one target 5 outside the vehicle 2.

The previous description of the embodiments describes the present invention only within the scope of examples. Naturally, also single features of the embodiments as far as technically meaningful can be freely combined with one another without leaving the scope of the present invention.

REFERENCE LIST 1 radar system
2 vehicles
3 interface, CAN-interface
4 control unit
5 target
5a stationary target
5b dynamic target
10 radar sensor
100 Method
105 initialisation step
110 prediction step
120 classification step
130 decision step
130a first decision
130b second decision
140 estimation method, estimation step
140a first estimation method
140b second estimation method
150 correction step
160 odometry correction
210 variance information
250 minimum number of stationary targets
251 minimum velocity
vEgo ego-velocity
vR relative velocity

The invention claimed is:

1. A method for operating a radar system of a vehicle, the radar system having at least one radar sensor for detecting at least one target outside the vehicle, the method comprising the following steps:
performing a prediction of an ego-velocity (vEgo) of the vehicle to determine prediction result;
performing a classification for classifying the at least one detected target as a stationary target using the prediction result to determine a classification result;
selecting one of at least two estimation methods for an estimation of the ego-velocity (vEgo), wherein the selection is dependent on an evaluation of the classification result; and
wherein a first estimation method of the at least two estimation methods comprises estimating the instantaneous ego-velocity (vEgo) of the vehicle based on the targets classified as stationary targets by using a regression algorithm.

2. The method according to claim 1, wherein the at least two estimation methods comprise:
a first estimation method in which a radar based velocity estimation is performed, which is dependent on the at least one target classified as the stationary target, and
a second estimation method in which an odometry based velocity estimation is performed, wherein a corrected odometric velocity is used based on a velocity information read from an interface of the vehicle.

3. The method according to claim 1 wherein the evaluation of the classification result on which the selection is dependent comprises:
comparing a number of targets classified as being stationary targets with a predetermined minimum number of stationary targets, wherein a first estimation method is performed only if this number of targets is higher than or equal to the minimum number of stationary targets, and a second estimation method is performed only if the predicted ego-velocity (vEgo) is higher than or equal to a predetermined minimum velocity.

4. The method according to claim 3, wherein the predetermined minimum number of stationary targets is at least 1.

5. The method according to claim 1, wherein, the step of performing the prediction comprises:
predicting the ego-velocity (vEgo) and determining corresponding variance information by using at least one of Kalman filtering and a tracking algorithm.

6. A method for operating a radar system of a vehicle, the radar system having at least one radar sensor for detecting at least one target outside the vehicle, the method comprising the following steps:
   performing a prediction of an ego-velocity (vEgo) of the vehicle to determine prediction result;
   performing a classification for classifying the at least one detected target as a stationary target using the prediction result to determine a classification result;
   selecting one of at least two estimation methods for an estimation of the ego-velocity (vEgo), wherein the selection is dependent on an evaluation of the classification result;
   wherein, the step of performing the prediction comprises predicting the ego-velocity (vEgo) and determining corresponding variance information by using at least one of Kalman filtering and a tracking algorithm; and
   wherein the determined variance information is used for performing the classification by determining a comparison range based on the variance information, wherein a relative velocity (vR) of each detected target is compared to the comparison range, and the at least one detected target is classified as a stationary target if the relative velocity (vR) lies within the comparison range.

7. The method according to claim 1, wherein a first estimation method of the at least two estimation methods comprises:
   estimating the instantaneous ego-velocity (vEgo) of the vehicle based on the targets classified as stationary targets by using a regression algorithm.

8. The method according to claim 1, wherein a second estimation method of the at least two estimation methods comprises:
   estimating the instantaneous ego-velocity (vEgo) of the vehicle based on a corrected odometric velocity, wherein the corrected odometric velocity is determined from an odometric velocity that is corrected by a linear model.

9. A method for operating a radar system of a vehicle, the radar system having at least one radar sensor for detecting at least one target outside the vehicle, the method comprising the following steps:
   performing a prediction of an ego-velocity (vEgo) of the vehicle to determine prediction result;
   performing a classification for classifying the at least one detected target as a stationary target using the prediction result to determine a classification result;
   selecting one of at least two estimation methods for an estimation of the ego-velocity (vEgo), wherein the selection is dependent on an evaluation of the classification result; and
   wherein after the step of selecting the selected estimation method is performed, and after the step of performing the selected estimation method, at least one parameter of the prediction for a Kalman-Filtering is adapted and/or corrected using the estimated ego-velocity (vEgo).

10. The method according to claim 9, wherein before or after the step of adapting the parameter of the prediction, an odometry correction is performed based on a parameter estimation using a Recursive Least Square approach.

* * * * *